(12) United States Patent
Azhar et al.

(10) Patent No.: US 11,975,548 B2
(45) Date of Patent: May 7, 2024

(54) RECORDING APPARATUS

(71) Applicant: Seiko Epson Corporation, Tokyo (JP)

(72) Inventors: Saeful Azhar, Jawa Barat (ID); Erik Hidayat, Jawa Barat (ID)

(73) Assignee: Seiko Epson Corporation, Tokyo (JP)

( * ) Notice: Subject to any disclaimer, the term of this patent is extended or adjusted under 35 U.S.C. 154(b) by 135 days.

(21) Appl. No.: 17/656,961

(22) Filed: Mar. 29, 2022

(65) Prior Publication Data

US 2022/0314668 A1 Oct. 6, 2022

(30) Foreign Application Priority Data

Apr. 1, 2021 (JP) ................. 2021-062674

(51) Int. Cl.
*B41J 29/13* (2006.01)
*B41J 29/02* (2006.01)
*H04N 1/00* (2006.01)

(52) U.S. Cl.
CPC ............. *B41J 29/13* (2013.01); *B41J 29/02* (2013.01); *H04N 1/00535* (2013.01); *H04N 1/00551* (2013.01)

(58) Field of Classification Search
CPC ..... B41J 29/02; B41J 29/13; B65H 2402/441; B65H 2402/45; H04N 1/00535; H04N 1/00551
See application file for complete search history.

(56) References Cited

U.S. PATENT DOCUMENTS

| | | | | |
|---|---|---|---|---|
| 11,128,777 | B2* | 9/2021 | Sasaki | ...................... B65H 1/02 |
| 2007/0001382 | A1* | 1/2007 | Matsumoto | ............... B65H 1/02 |
| | | | | 271/162 |
| 2018/0034986 | A1 | 2/2018 | Ishida et al. | |
| 2019/0077147 | A1 | 3/2019 | Yazaki | |
| 2019/0291431 | A1 | 9/2019 | Sugawara et al. | |
| 2020/0406624 | A1* | 12/2020 | Miyasaka | ............... B41J 2/1721 |

FOREIGN PATENT DOCUMENTS

| | | |
|---|---|---|
| JP | 2006-044083 | 2/2006 |
| JP | 2012-061689 | 3/2012 |
| JP | 2018-016051 | 2/2018 |

* cited by examiner

*Primary Examiner* — Anh T Vo
(74) *Attorney, Agent, or Firm* — WORKMAN NYDEGGER

(57) ABSTRACT

A recording apparatus includes a housing, a recording unit that is accommodated in the housing and that performs recording on a medium, a medium supply port that is provided in an upper portion of the housing, and where the medium is set to supply the medium toward the recording unit, and a medium support member that supports the medium set in the medium supply port, wherein the medium support member includes a first support member configured to be opened and closed with respect to the medium supply port and a second support member that rotatably supports the first support member, and the recording apparatus includes a biasing mechanism configured to, when the first support member is in a closed state with respect to the medium supply port, bias the first support member in a first direction toward the housing which faces a distal end portion of the first support member.

7 Claims, 11 Drawing Sheets

RECORDING APPARATUS

The present application is based on, and claims priority from JP Application Serial Number 2021-062674, filed Apr. 1, 2021, the disclosure of which is hereby incorporated by reference herein in its entirety.

BACKGROUND

1. Technical Field

The present disclosure relates to a recording apparatus.

2. Related Art

In the related art, as shown in JP-A-2018-16051, there is known an image forming apparatus provided at an upper portion of the housing with a sheet feed cover configured to open and close with respect to the housing.

However, in the above-described apparatus, a gap is provided between the housing and the sheet feed cover for hooking a finger onto the sheet feed cover. For this reason, there is a problem in that the outer appearance lacks design qualities.

SUMMARY

A recording apparatus includes a housing, a recording unit that is accommodated in the housing and that performs recording on a medium, a medium supply port that is provided in an upper portion of the housing, and where the medium is set to supply the medium toward the recording unit, and a medium support member that supports the medium set in the medium supply port, wherein the medium support member includes a first support member configured to be opened and closed with respect to the medium supply port and a second support member that rotatably supports the first support member, and the recording apparatus includes a biasing mechanism configured to, when the first support member is in a closed state with respect to the medium supply port, bias the first support member in a first direction toward the housing which faces a distal end portion of the first support member.

DESCRIPTION OF EMBODIMENTS

Figure 1:
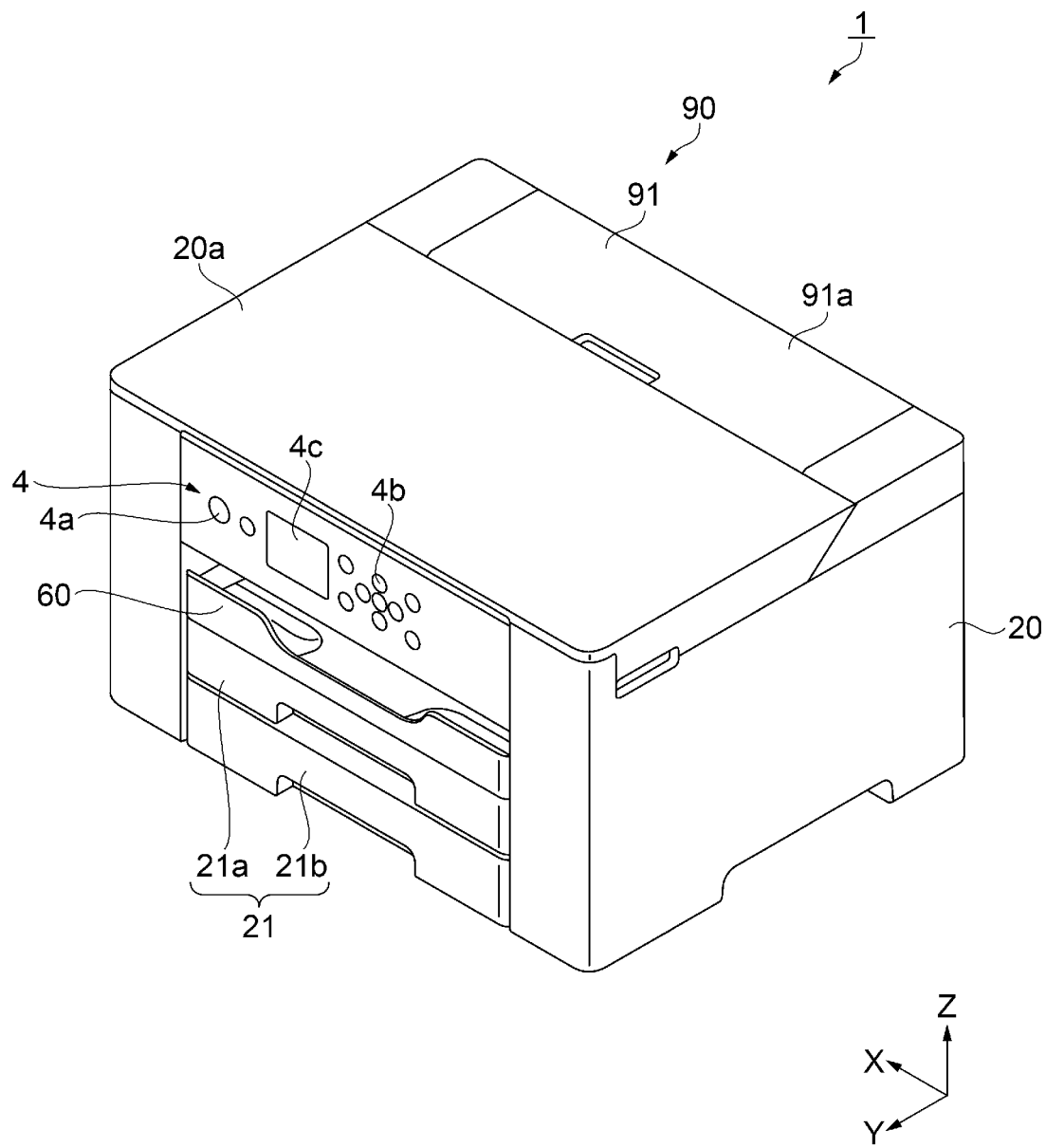
FIG. 1 is a perspective view showing configuration of a recording apparatus.
Figure 2:
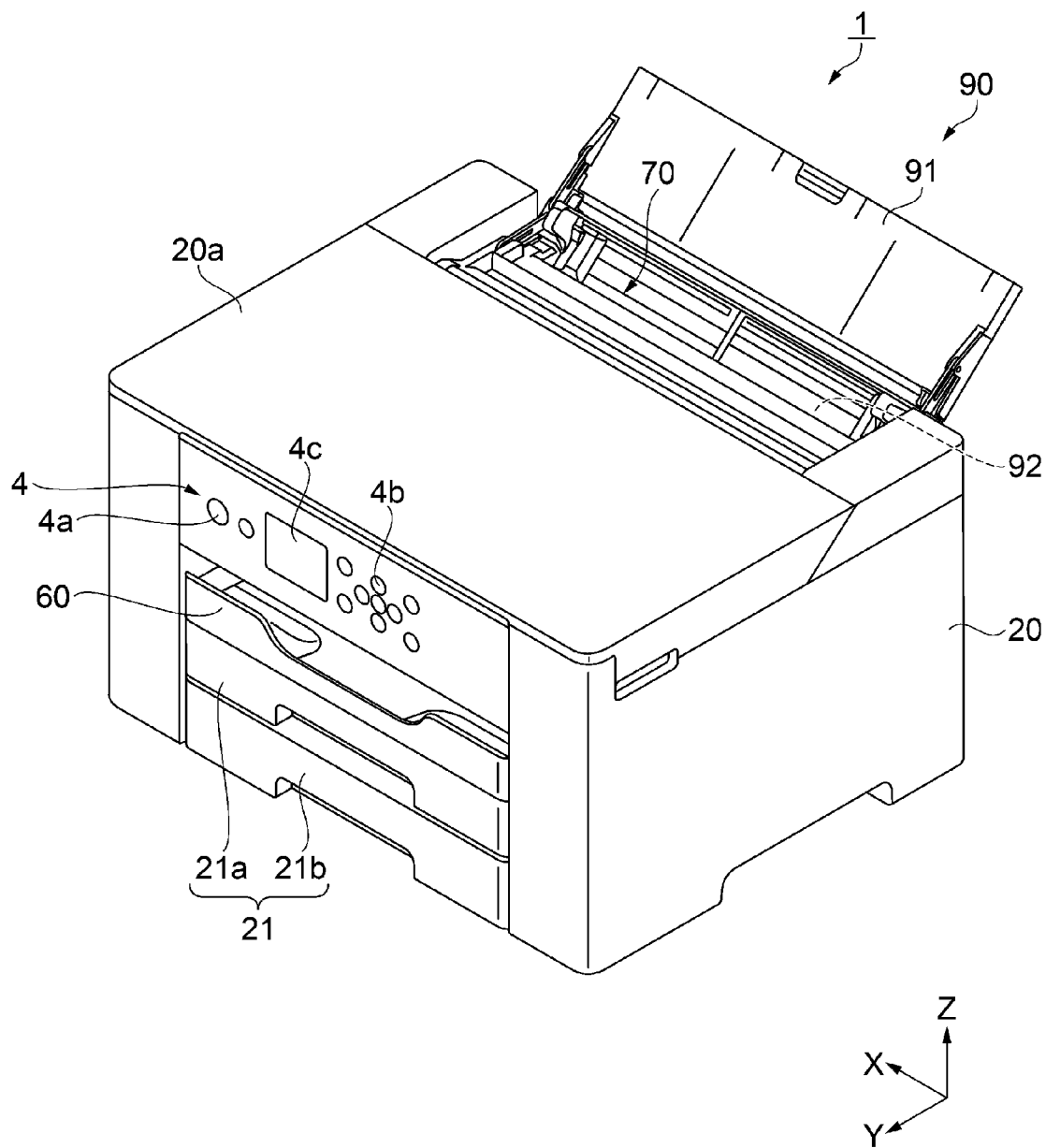
FIG. 2 is a perspective view showing configuration of the recording apparatus.
Figure 3:
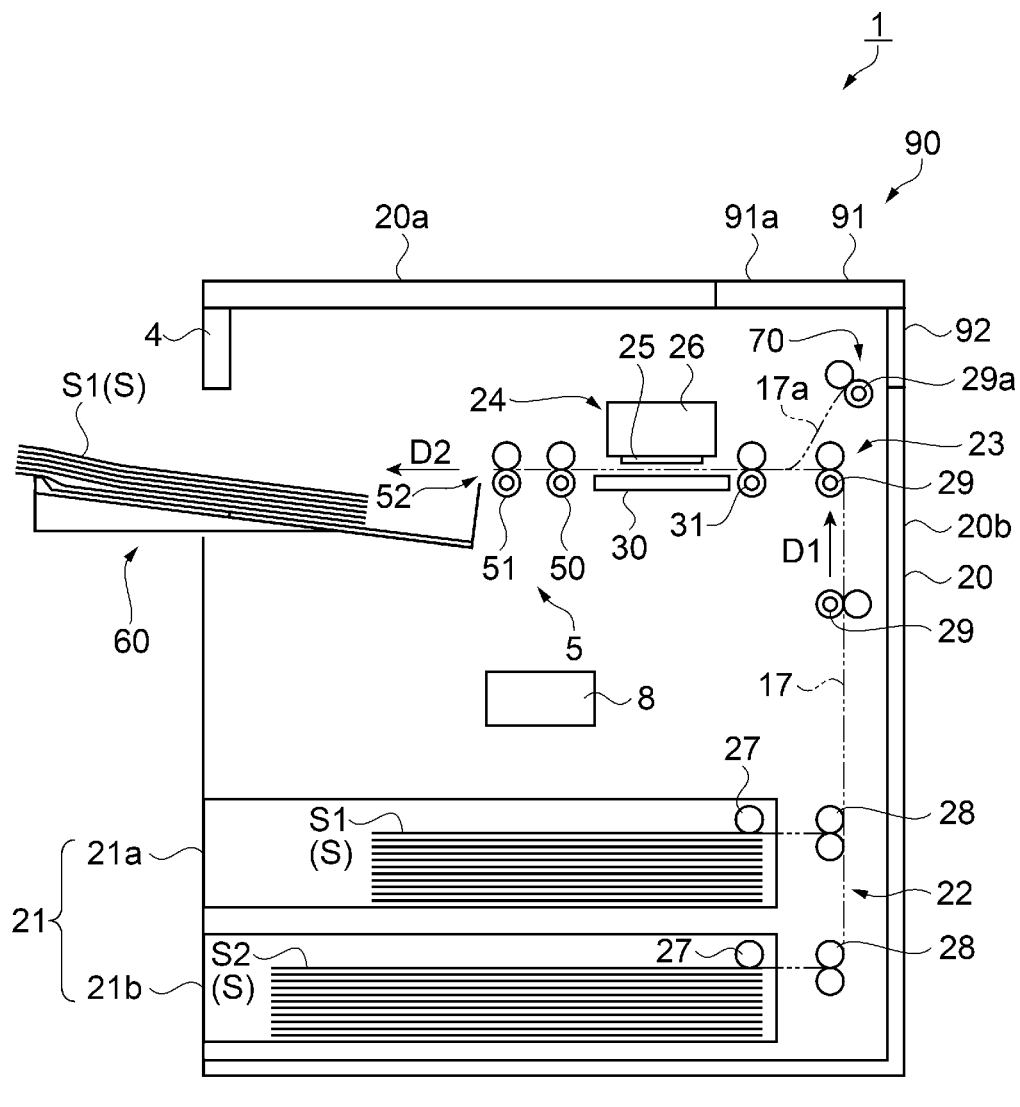
FIG. 3 is a schematic cross-sectional view showing configuration of the recording apparatus.

First, configuration of a recording apparatus 1 will be described. FIGS. 1 and 2 are external perspective views illustrating the recording apparatus 1. FIG. 1 shows a medium support member 90 when in a closed state, and FIG. 2 shows the medium support member 90 when in an opened state. FIG. 3 is a schematic cross-sectional view showing configuration of the recording apparatus 1. The recording apparatus 1 is, for example, an inkjet printer configured to record on a sheet S as a medium.

As shown in FIGS. 1 and 2, the recording apparatus 1 includes a housing 20, and an operation unit 4 for operating the recording apparatus 1 is provided on the front side in the +Y direction of the housing 20. The operation unit 4 is a panel that is horizontally elongated in a direction along the X-axis, and is provided with a power button 4a that is operated when the recording apparatus 1 is turned on or off, input buttons 4b by which various kinds of operation information can be input, and an operation panel 4c provided with a display of operation state of the recording apparatus 1 and the like and operation buttons of the recording apparatus 1. The operation panel 4c is a touch panel.

As shown in FIG. 3, the housing 20 accommodates sheet cassettes 21, a feeder 22, a transport unit 23, a recording unit 24, a discharge unit 5, a control unit 8, and the like.

A transport path 17 indicated by a two-dot chain line is set in the housing 20, and the sheet S is conveyed in the transport direction D1.

The sheet cassettes 21 are installed in a lower portion of the recording apparatus 1, so as to be attachable to and detachable from the housing 20. The sheet cassettes 21 are storage portions configured to store sheets S in a stacked state. The sheet cassettes 21 of the present embodiment include a sheet cassette 21a that accommodates a sheet S1 serving as a first medium and a sheet cassette 21b that accommodates a sheet S2 serving as a second medium larger in size than the sheet S1. The sheet S1 is, for example, a A4 size sheet, and the sheet S2 is, for example, a A3 size sheet.

The feeder 22 feeds the sheets S stored in the sheet cassettes 21 to the transport unit 23. The feeder 22 includes pickup rollers 27 that feed the uppermost sheets S among the sheets S stacked in the sheet cassettes 21, and separation roller pairs 28 that separate one by one the sheets S fed out by the pickup rollers 27. Further, the feeder 22 includes a sheet feed motor (not shown) for rotationally driving the pickup rollers 27. By driving the pickup rollers 27 and the separation roller pairs 28 corresponding to the sheet cassettes 21a and 21b on which the sheets S used for recording (printing) are stacked, the sheets S used for recording are fed to the transport unit 23.

The transport unit 23 transports the fed sheet S to the recording unit 24. The transport unit 23 includes transport roller pairs 29 and 31 rotated by the drive of a transporting motor (not shown) to transport the sheet S along the transport path 17. A platen 30 is disposed along the transport path 17 at a position facing the recording unit 24. The sheet S is transported in a state of being sucked onto a support surface (upper surface) of the platen 30.

The recording unit 24 includes a recording head 25 that ejects ink as a liquid toward the sheet S, a carriage 26 on which the recording head 25 is mounted and which is configured to be movable in a width direction (direction along the X-axis) intersecting the transport direction D1 of the sheet S, an ink cartridge (not shown) that supplies ink to the recording head 25, and the like. The recording head 25 is provided at a position facing the platen 30 from across the transport path 17.

The recording unit 24 performs recording (printing) by forming an image by ejecting ink, based on the recording data (print data), onto the sheet S that is supported by the platen 30 and transported, thereby causing the ink to adhere to the sheet S. The recording data is data for causing the recording apparatus 1 to execute recording, which is generated based on print-image data such as text data or image data to be recorded on the sheet S. The sheet S on which recording was performed is transported by the transport unit 23 and sent to the discharge unit 5 provided downstream of the recording head 25 in the transport direction D1.

The discharge unit 5 includes a sheet discharge roller pair 50 provided downstream of the recording unit 24 in the transport direction D1 and a sheet discharge roller pair 51 provided downstream of the sheet discharge roller pair 50 in the transport direction D1. The discharge unit 5 uses the sheet discharge roller pairs 50 and 51 to discharge the recorded sheet S in a discharge direction D2 from an outlet 52 to a discharge tray 60. When sheets S are continuously recorded and discharged, the discharged sheets S are sequentially stacked on the previously discharged sheets S.

The control unit 8 controls the feeder 22, the transport unit 23, the recording unit 24, the discharge unit 5, the discharge tray 60, the operation panel 4c, and the like.

Further, in addition to supplying the sheets S from the sheet cassettes 21a and 21b, the recording apparatus 1 according to the present embodiment is configured to be set with and feed sheets S from the rear surface side in the −Y direction of the housing 20. Specifically, a medium supply port 70 configured to supply a sheet S toward the recording unit 24 is provided in an upper portion of the housing 20. The medium support member 90 is provided above the medium supply port 70 and configured to be opened and closed with respect to the medium supply port 70. In the opened state of the medium support member 90, the medium support member 90 can support a sheet S to be supplied to the medium supply port 70.

The medium support member 90 includes a first support member 91 configured to be opened and closed with respect to the medium supply port 70 and a second support member 92 configured to support the first support member 91 so as to be rotatably movable. The first support member 91 and the second support member 92 are plate-shaped members.

As illustrated in FIG. 2, by placing the first support member 91 is in the opened state, the medium supply port 70 in the housing 20 is exposed and a sheet S can be supplied toward the medium supply port 70. The second support member 92 moves together with the first support member 91 in the −Y direction with respect to a rear surface 20b of the housing 20, into an opened state. As a result, the medium support member 90 is in an inclined state and can support the sheet S in a stable state.

The sheet S set toward the medium supply port 70 is transported along a transport path 17a by a transport roller pair 29a. The transport path 17a merges with the transport path 17, and the sheet S is transported toward the recording unit 24 by the transport roller pair 31.

When the medium support member 90 is in the closed state, an upper surface 91a of the first support member 91 serves as a part of the exterior of the recording apparatus 1. The upper surface 91a of the first support member 91 and an upper surface 20a of the housing 20 are formed in the same plane. That is, they are formed flush with each other without a difference in level.

Next, a biasing mechanism 100 will be described.

The biasing mechanism 100 is a mechanism that biases the first support member 91 while it is in the closed state, in a first direction (+Y direction) that is to the side of the housing 20 that faces the distal end portion (+Y direction end portion) of the first support member 91.

Figure 4A:
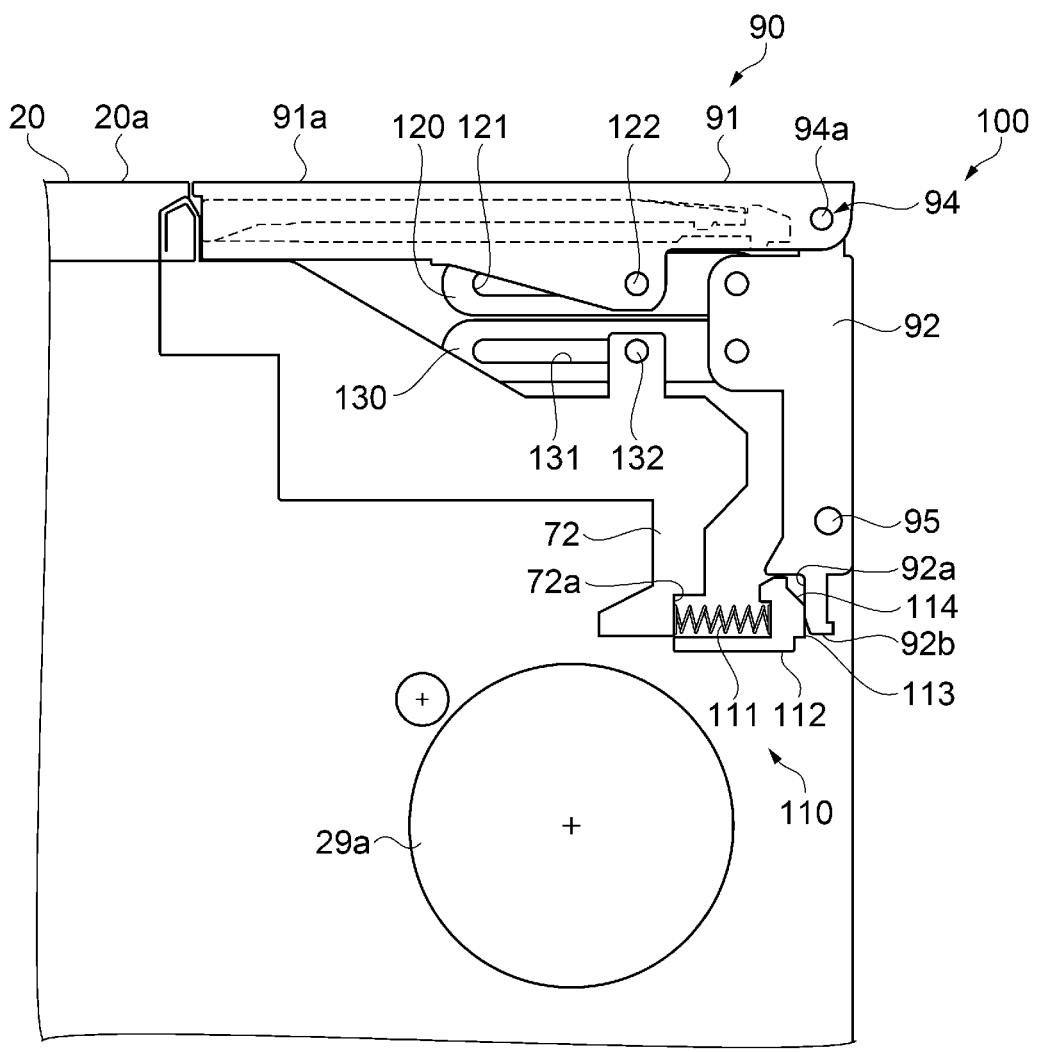
FIG. 4A is a diagram showing configuration of a biasing mechanism.

As shown in FIG. 4A, the biasing mechanism 100 of this embodiment includes a connection portion 94 that is provided at one end of the second support member 92 (in FIG. 4A, the +Z direction end of the second support member 92) and that is coupled to the first support member 91, and a cam unit 110 that biases the other end of the second support member 92 (in FIG. 4A, the −Z direction end of the second support member 92) in a second direction (the −Y direction) opposite to the first direction.

The connection portion 94 is provided to the second support member 92 and has a shaft 94a extending in the X-axis direction, and couples the first support member 91 and the second support member 92 to each other via the shaft 94a. The first support member 91 is rotatably coupled to the second support member 92 via the shaft 94a. That is, the second support member 92 rotatably supports the first support member 91.

Further, the second support member 92 is configured to be rotatable with respect to the housing 20 by a shaft 95 provided at a position closer to the other end than to the one end. The shaft 95 is fixedly arranged within the housing 20 and extends in the X-axis direction.

The cam unit 110 includes a spring member 111 and a sliding portion 112 that is movable in a first direction (+Y direction) and a second direction (−Y direction) in association with displacement of the spring member 111.

The spring member 111 is a compression spring. The +Y direction end portion of the spring member 111 is coupled to a wall surface 72a of a fixed wall 72 fixed in the housing 20. The −Y direction end portion of the spring member 111 is coupled to the sliding portion 112. The spring member 111 biases the sliding portion 112 in the second direction (−Y direction).

A convex portion 113 protruding in the −Y direction is provided at an −Y direction end portion of the sliding portion 112. The convex portion 113 is disposed to face a side surface 92a formed in the +Y direction of the other end of the second support member 92. When the first support member 91 is in the closed state, the convex portion 113 abuts the side surface 92a of the second support member 92 and, by the spring force of the spring member 111, urges the other end of the second support member 92 in the second direction.

Accordingly, the other end of the second support member 92 is pressed in the −Y direction. As a result, the second support member 92 rotates about the shaft 95 in the counterclockwise direction in FIG. 4A, and the one end of the second support member 92 moves in the +Y direction. Accordingly, the first support member 91, which is coupled to the connection portion 94 at the one end of the second support member 92, is biased in the +Y direction. That is, the end portion of the first support member 91 in the +Y direction is biased toward the housing 20 which faces it.

As described above, according to the present embodiment, the upper surface 91a of the first support member 91 and the upper surface 20a of the housing 20 are formed in the same plane. Further, since the first support member 91 is biased toward the housing 20 (in the +Y direction) while the first support member 91 is in the closed state, a gap between the housing 20 and the first support member 91 can be eliminated. Therefore, it is possible to provide the recording apparatus 1 with excellent design.

Figure 4B:
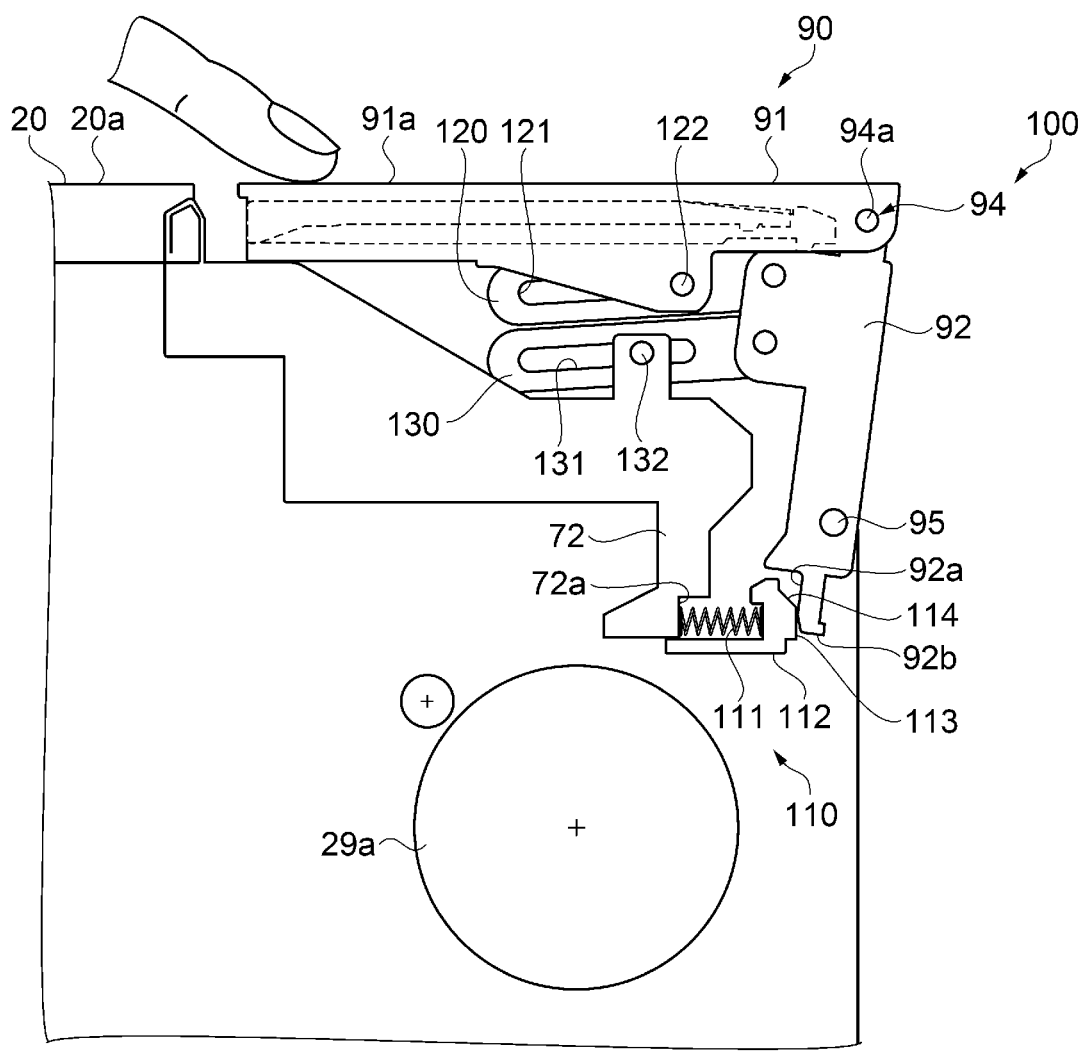
FIG. 4B is a diagram showing configuration of the biasing mechanism.

It should be noted that when the medium support member 90 is displaced from the closed state to the opened state, as illustrated in FIG. 4B, the first support member 91 in the closed state is slid and moved in the −Y direction with a finger. When the first support member 91 is pressed in the −Y direction, the one end side of the second support member 92 is moved in the −Y direction by the connection portion 94. As a result, the second support member 92 rotates around the shaft 95 in the clockwise direction, and the other end of the second support member 92 moves in the +Y direction. Then, the sliding portion 112 is pressed in the +Y direction. The spring member 111 is compressed, and the sliding portion 112 moves (slides) in the +Y direction.

Thus, a gap is formed between the housing 20 and the first support member 91, and a finger can be hooked onto the first support member 91 through the gap to rotate the first support member 91 about the shaft 94a of the connection portion 94 into the opened state.

Next, an opening and closing mechanism of the medium support member 90 will be described.

Figure 5:
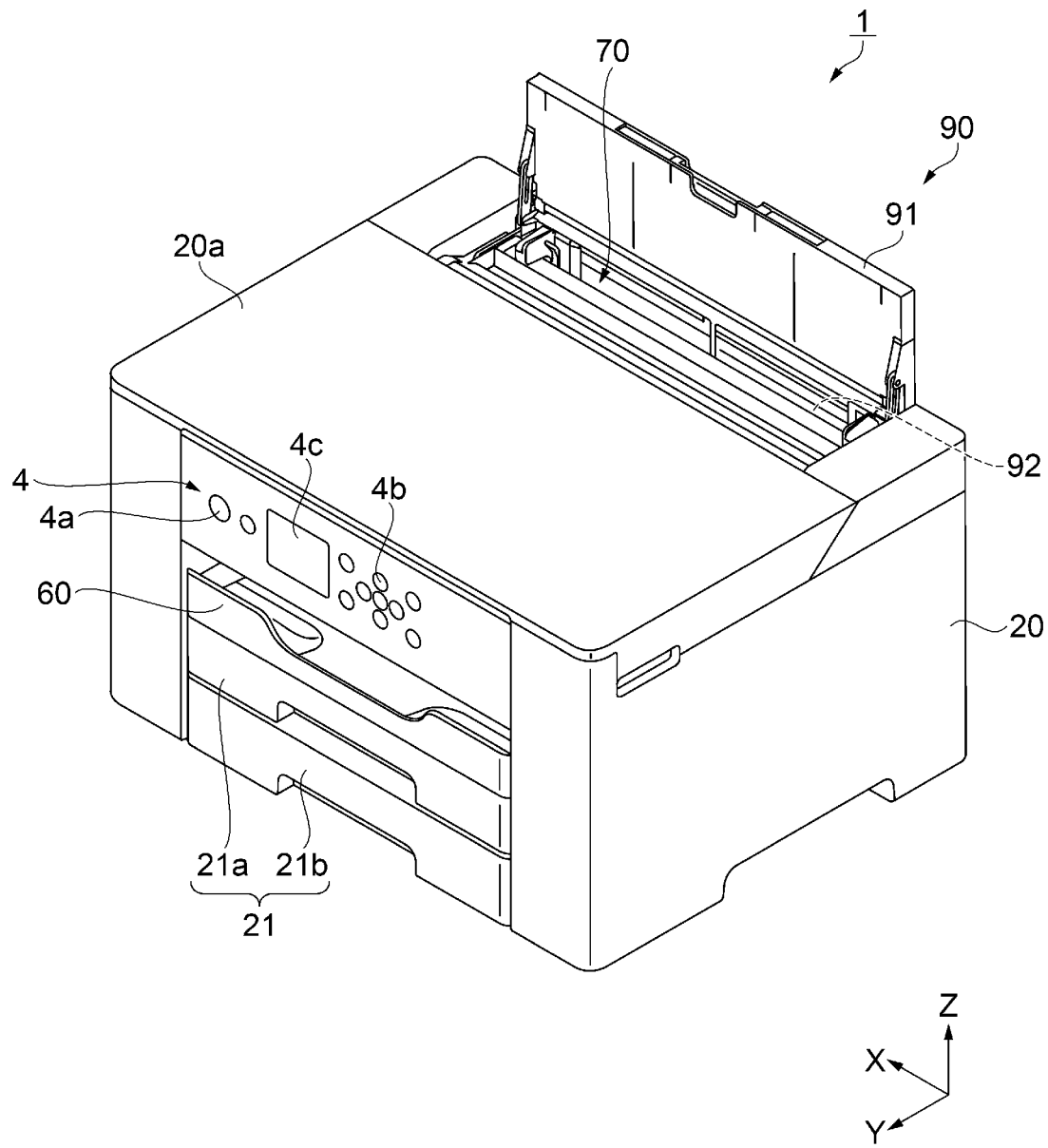
FIG. 5 is a perspective view showing opening and closing of a medium support member.
Figure 6:
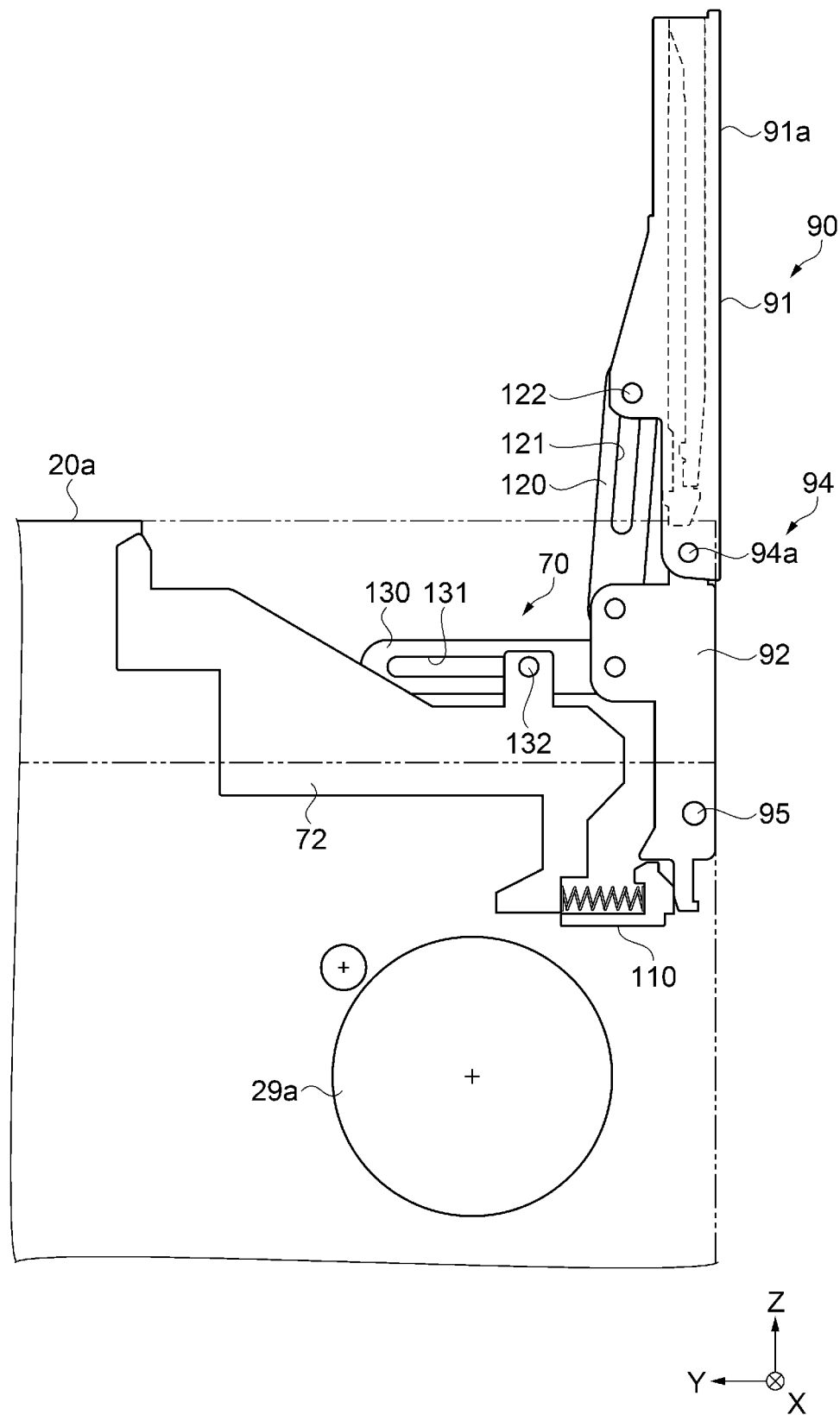
FIG. 6 is a schematic diagram corresponding to FIG. 5.

FIG. 5 shows a state in which the first support member 91 was rotated with respect to the second support member 92. FIG. 6 is a schematic view of FIG. 5. The medium support member 90 in FIGS. 5 and 6 is in an intermediate state prior to being fully opened.

With respect to the first support member 91 in the closed state, the +Y direction end portion of the first support member 91 is moved upward. The first support member 91 rotates with respect to the second support member 92 via the connection portion 94 (the shaft 94a). By this, the medium supply port 70 is exposed, and the first support member 91 is displaced to the opened state with respect to the medium supply port 70.

Here, the displacement range of the first support member 91 with respect to the second support member 92 is regulated by a first restriction member 120. The first restriction member 120 is an elongated plate-shaped ring member in which a slit 121 is formed. The slit 121 is a through hole. One end of the first restriction member 120 is rotatably coupled to the second support member 92. A shaft 122 provided in the first support member 91 is disposed so as to pass through the slit 121 of the first restriction member 120. The diameter of the shaft 122 is a size that can move within the slit 121. A dimension range of the slit 121 in the longitudinal direction is a displacement range (movement range) of the first support member 91 with respect to the second support member 92.

That is, as shown in FIG. 4A, when the first support member 91 is in the closed state, the shaft 122 of the first support member 91 is positioned at one end of the slit 121 on the side close to the second support member 92. As shown in FIG. 6, when the first support member 91 is in the opened state, the shaft 122 of the first support member 91 is positioned at the other end of the slit 121 at the side far from the second support member 92. At this time, since the movement of the shaft 122 is restricted by the other end of the slit 121, further rotational movement of the first support member 91 with respect to the second support member 92 becomes impossible. Accordingly, the posture of the first support member 91 with respect to the second support member 92 is maintained constant.

Note that in the intermediate state of the medium support member 90 shown in FIGS. 5 and 6, the position of the first support member 91 cannot be maintained. That is, when the finger is removed from the first support member 91 while it is in the intermediate state, the first support member 91 returns to the closed state due to its own weight. In addition, since the connection portion 94 is biased in the +Y direction by the cam unit 110, the first support member 91 easily returns to the closed state. Thus it is possible to prevent the recording apparatus 1 from being used in a state in which the posture of the medium support member 90 is incomplete and it is possible to avoid damage to the recording apparatus 1.

Figure 7:
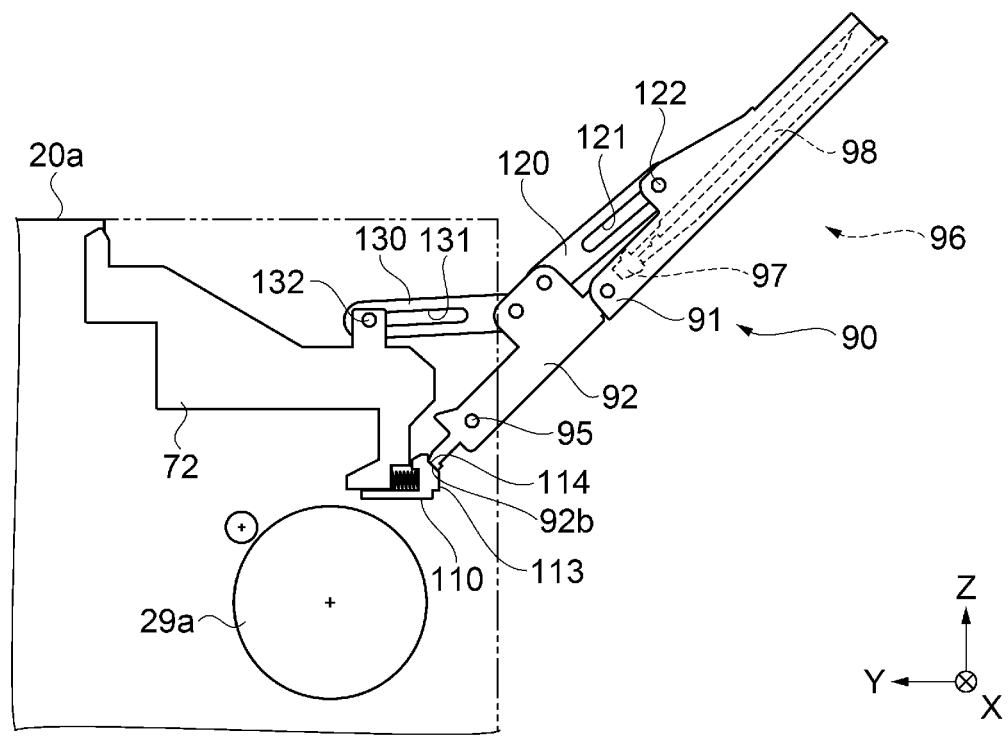
FIG. 7 is a schematic diagram corresponding to FIG. 2.
Figure 8:
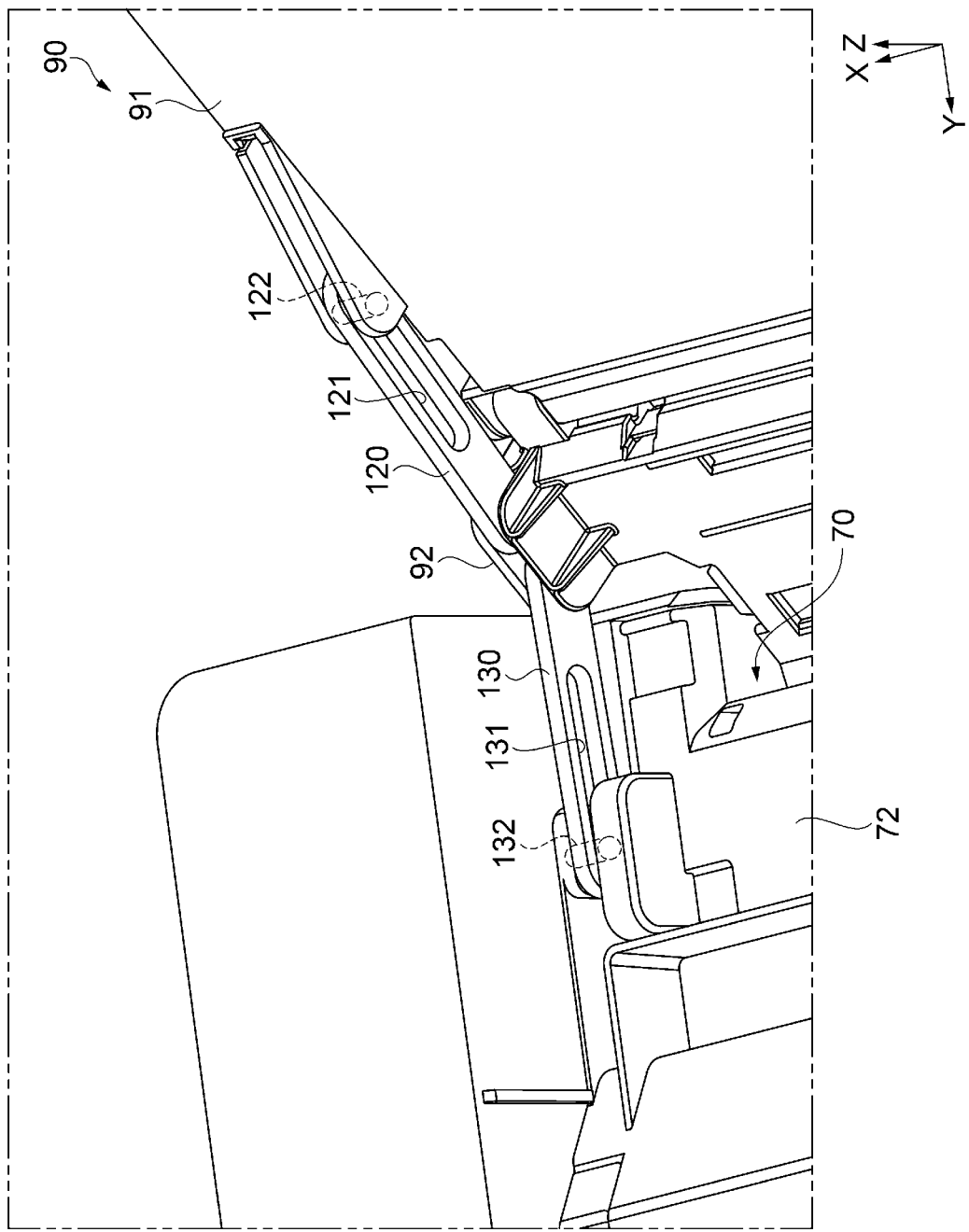
FIG. 8 is a partially enlarged view of FIG. 2.

FIG. 7 shows when the medium support member 90 is in an opened state and is a schematic diagram that corresponds to FIG. 2. FIG. 8 is a partial enlargement of FIG. 2.

From the intermediate state of the medium support member 90 in FIGS. 5 and 6, the +Y direction end portion of the first support member 91 is further moved in the −Y direction.

By this, the first support member 91 and the second support member 92 rotate in the clockwise direction about the shaft 95, and move to a position where they are inclined with respect to and intersect the second direction. That is, the first support member 91 and the second support member 92 intersect the direction along the Y axis, and the medium support member 90 is inclined upward in the −Y direction. By this, the medium support member 90 enters the opened state in an inclined state, and a sheet S can be supported in a stable state.

In addition, the sliding portion 112 is provided with a recess portion 114 that is concave toward the first direction side (+Y direction side) from the arrangement position of the convex portion 113. The recess portion 114 is disposed above the convex portion 113. The recess portion 114 is formed with an inclined surface slanting downward in the −Y direction.

When the first support member 91 and the second support member 92 are rotated in the clockwise direction around the shaft 95, the second support member 92 presses the sliding portion 112 in the first direction (+Y direction) from a state of being biased in the second direction (−Y direction) by the convex portion 113, and rotates until an end face 92b of the other end of the second support member 92 abuts the inclined surface of the recess portion 114. By this, the rotational movement of the second support member 92 is restricted by the recess portion 114. Further, the second support member 92 is biased obliquely upward by the cam unit 110, and a state in which the second support member 92 is inclined is maintained.

In addition, when the second support member 92 is rotated in the clockwise direction around the shaft 95, a clicking sensation is generated due to a difference in the biasing force of the cam unit 110 during the transition from contact between the side surface 92a and the convex portion 113 to contact between the end face 92b and the recess portion 114. By this, the user can easily confirm that the medium support member 90 is in a fully opened state.

Further, a second restriction member 130 is provided for regulating a displacement range of the second support member 92 with respect to the housing 20. The second restriction member 130 is a long plate-shaped ring member in which a slit 131 is formed. The slit 131 is a through hole. One end of the second restriction member 130 is rotatably coupled to the second support member 92. A shaft 132 provided on the fixed wall 72 in the housing 20 is disposed in a state of passing through the slit 131 of the second restriction member 130. The diameter of the shaft 132 is a size capable of moving within the slit 131. The dimensional range of the slit 131 in the longitudinal direction becomes the displacement range (movement range) of the second support member 92 with respect to the housing 20.

That is, as shown in FIGS. 4A and 6, when the second support member 92 is in the closed state, the shaft 132 of the fixed wall 72 is positioned at one end of the slit 131 closer to the second support member 92. When the second support member 92 enters the opened state as shown in FIG. 7, the shaft 132 of the fixed wall 72 is positioned at the other end of the slit 131 close to the fixed wall 72. At this time, since the movement of the second support member 92 is restricted by the shaft 132 via the second restriction member 130, further rotational movement of the second support member 92 with respect to the housing 20 is not possible. Thus, the posture of the second support member 92 with respect to the housing 20 is maintained constant.

Figure 9:
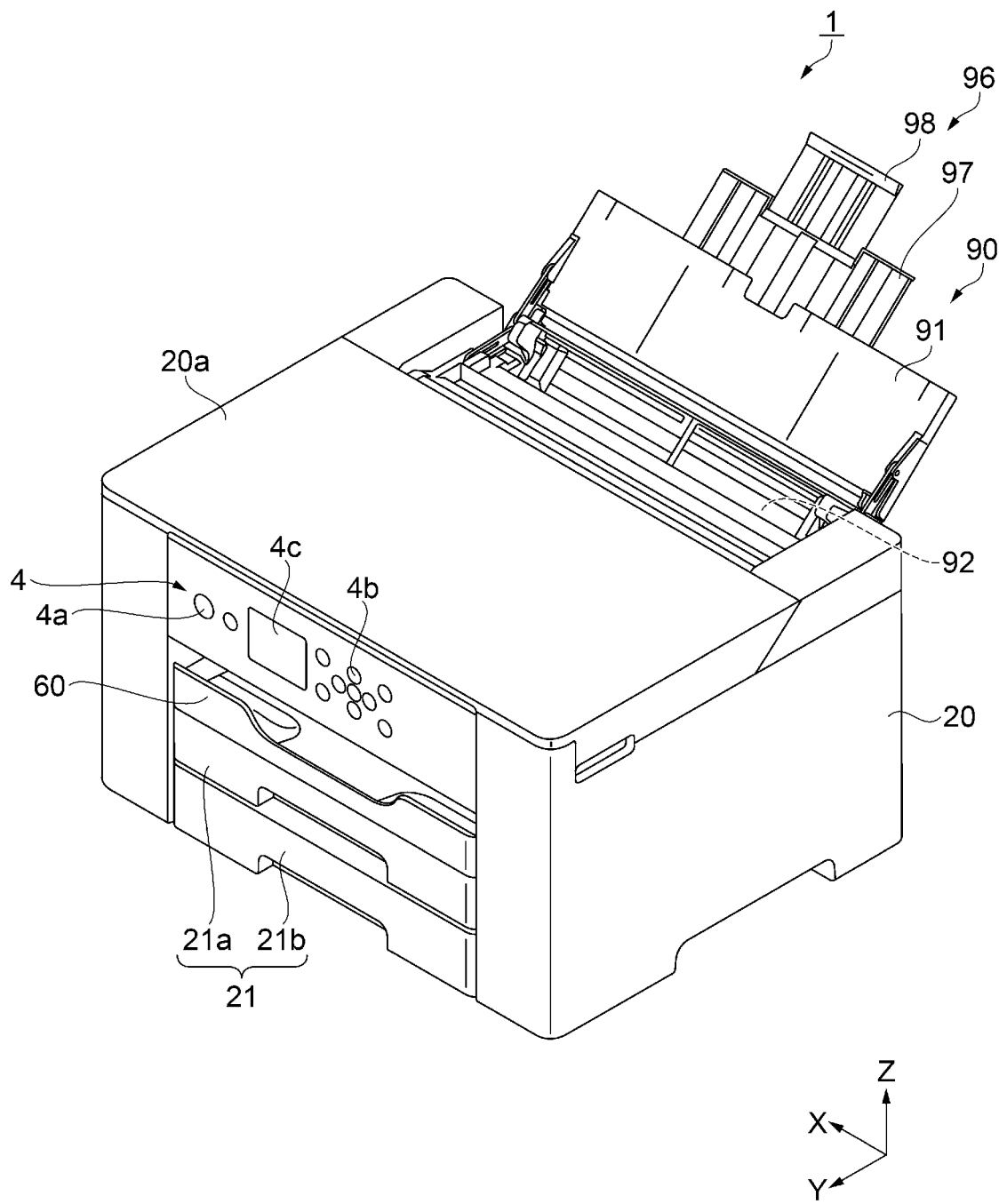
FIG. 9 is a perspective view showing opening and closing of the medium support member.
Figure 10:
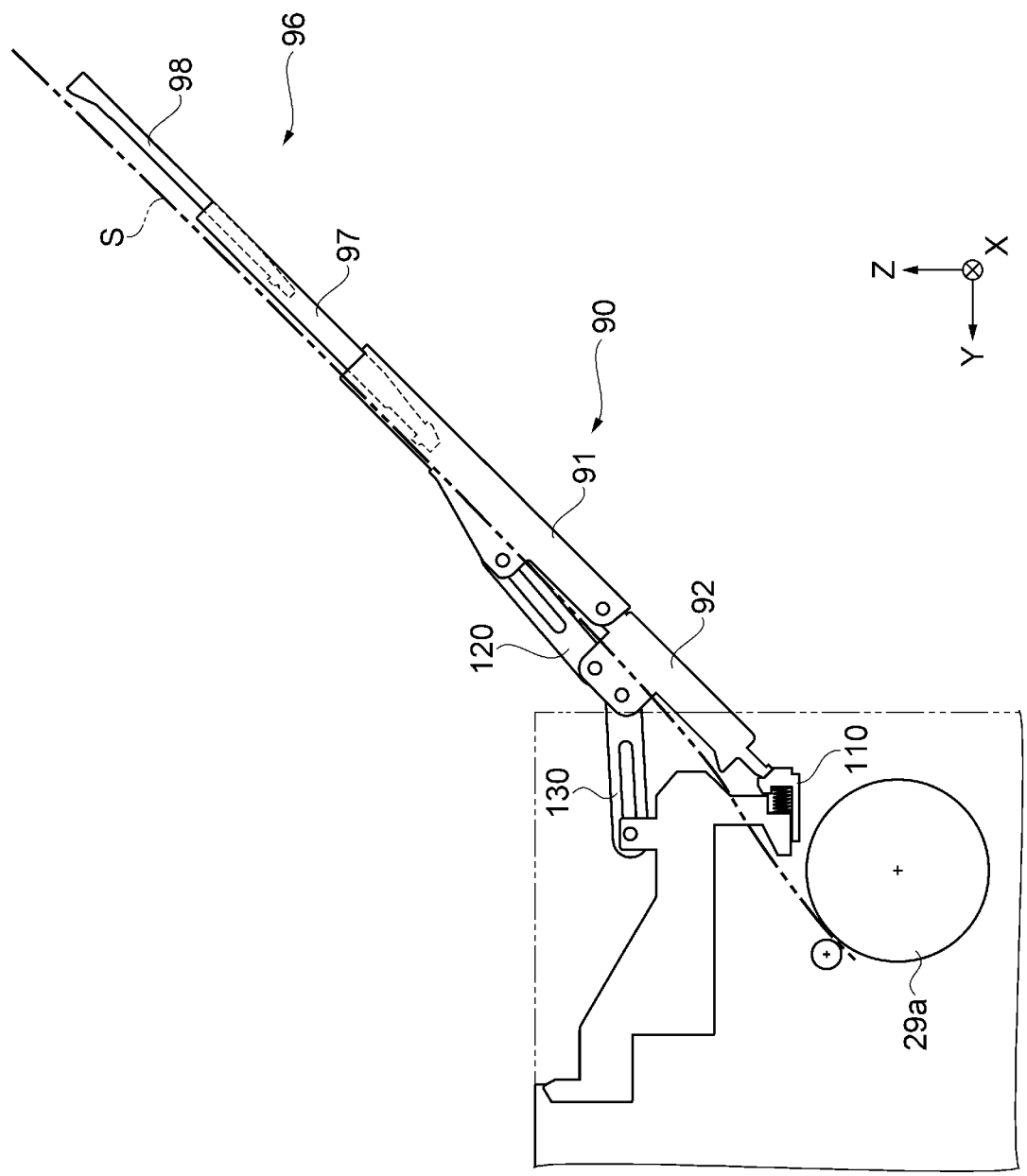
FIG. 10 is a schematic diagram corresponding to FIG. 9.

As shown in FIGS. 9 and 10, the first support member 91 includes an extension member 96 that can extend in the height direction. The extension member 96 of the present embodiment includes a third support member 97 and a fourth support member 98 configured to support the sheet S.

As shown in FIG. 7, the third support member 97 and the fourth support member 98 are configured to be accommodated in the first support member 91. While the first support member 91 and the second support member 92 are in an opened state, by pulling out the third support member 97 and the fourth support member 98 that are accommodated in the first support member 91, the third support member 97 and the fourth support member 98 extend in the height direction. Accordingly, the support area of the sheet S on the medium support member 90 increases, and the sheet S can be supported in a stable state. In addition, when the medium support member 90 is in the closed state, it is possible to make the recording apparatus 1 compact by shortening the extension member 96 and storing the extension member 96 in the first support member 91.

What is claimed is:

1. A recording apparatus comprising:
a housing;
a recording unit that is accommodated in the housing and that performs recording on a medium;
a medium supply port that is provided in an upper portion of the housing, and where the medium is set to supply the medium toward the recording unit; and
a medium support member that supports the medium set in the medium supply port, wherein
the medium support member includes a first support member configured to be opened and closed with respect to the medium supply port and a second support member that rotatably supports the first support member,
the recording apparatus includes a biasing mechanism configured to, when the first support member is in a closed state with respect to the medium supply port, bias the first support member in a first direction toward the housing which faces a distal end portion of the first support member, and
a first restriction member is configured to regulate a displacement range of the first support member with respect to the second support member, and a second restriction member configured to regulate a displacement range of the second support member with respect to the housing.

2. The recording apparatus according to claim 1, wherein when the first support member is in a closed state with respect to the medium supply port, the first support member and an upper surface of the housing are formed in the same plane.

3. The recording apparatus according to claim 2, wherein the biasing mechanism includes:
a connection portion provided at one end of the second support member and coupled to the first support member and
a cam unit configured to bias the other end of the second support member in a second direction opposite to the first direction.

4. The recording apparatus according to claim 3, wherein the cam unit includes:
a spring member and
a sliding portion configured to move in the first direction and the second direction in accordance with displacement of the spring member, wherein
a convex portion is provided at an end portion of the sliding portion in the second direction, and
the convex portion abuts against a side surface of the other end of the second support member and biases the second support member in the second direction.

5. The recording apparatus according to claim 4, wherein the first support member is displaced into an opened state with respect to the medium supply port by rotating with respect to the second support member via the connection portion,
the second support member is configured to be rotatable with respect to the housing, and
the second support member is displaced to a position where the second support member is inclined with respect to the second direction and intersects the second direction.

6. The recording apparatus according to claim 5, wherein the sliding portion is provided with a recessed portion recessed toward the first direction side from an arrangement position of the convex portion and
the second support member presses the sliding portion in the first direction from a state of being biased by the convex portion in the second direction, and is displaced until an end face of the other end of the second support member abuts against the recess portion.

7. The recording apparatus according to claim 1, wherein the first support member is provided with an extension member configured to extend in a height direction.

* * * * *